(12) United States Patent
Treichel

(10) Patent No.: US 7,004,510 B2
(45) Date of Patent: Feb. 28, 2006

(54) TUBING CONTAINMENT SYSTEM

(75) Inventor: Steven A. Treichel, West Chester, PA (US)

(73) Assignee: Omega Flex, Inc., Westfield, MA (US)

( * ) Notice: Subject to any disclaimer, the term of this patent is extended or adjusted under 35 U.S.C. 154(b) by 91 days.

(21) Appl. No.: 10/810,736

(22) Filed: Mar. 25, 2004

(65) Prior Publication Data

US 2004/0217593 A1    Nov. 4, 2004

Related U.S. Application Data

(60) Provisional application No. 60/458,110, filed on Mar. 26, 2003, provisional application No. 60/478,507, filed on Jun. 12, 2003.

(51) Int. Cl.
*F16L 25/00* (2006.01)

(52) U.S. Cl. ................ 285/334.5; 285/903; 285/123.1; 285/924

(58) Field of Classification Search ............. 285/344.5, 285/13, 14, 40, 93, 123.3, 123.12, 903, 924
See application file for complete search history.

(56) References Cited

U.S. PATENT DOCUMENTS

| | | | | |
|---|---|---|---|---|
| 1,793,887 | A | * | 2/1931 | Newton ................... 285/334.5 |
| 2,113,211 | A | * | 4/1938 | Lake ....................... 285/334.5 |
| 3,506,039 | A | * | 4/1970 | Marriott ...................... 285/14 |
| 3,980,112 | A | * | 9/1976 | Basham ................... 285/123.1 |
| 5,456,502 | A | * | 10/1995 | Sharp ...................... 285/123.1 |
| 5,713,607 | A | * | 2/1998 | Webb ...................... 285/123.1 |
| 5,969,618 | A | * | 10/1999 | Redmond ................... 340/604 |
| 6,173,995 | B1 | * | 1/2001 | Mau ........................... 285/903 |
| 6,315,003 | B1 | | 11/2001 | Albino |
| 6,502,866 | B1 | * | 1/2003 | Hujisawa et al. ........... 285/903 |

* cited by examiner

*Primary Examiner*—Aaron Dunwoody
(74) *Attorney, Agent, or Firm*—Cantor Colburn LLP

(57) ABSTRACT

An embodiment of the invention is a piping system including a fluid impermeable sleeve having a plurality of longitudinal, spaced ribs formed on an interior surface of the sleeve. A fluid carrying tubing is positioned internal to the sleeve. A coupling has a first end and a second end, the first end having interior threads engaging an outer surface of the sleeve. The coupling has a vent opening in fluid communication with the interior of the sleeve.

15 Claims, 2 Drawing Sheets

TUBING CONTAINMENT SYSTEM

CROSS REFERENCE TO RELATED APPLICATIONS

This application claims the benefit of U.S. provisional patent application 60/458,110 filed Mar. 26, 2003, the entire contents of which are incorporated herein by reference, and claims the benefit of U.S. provisional patent application 60/478,507 filed Jun. 12, 2003, the entire contents of which are incorporated herein by reference.

BACKGROUND OF THE INVENTION

Tubing containment systems exist in the art to contain fluids if the tubing leaks. One existing tubing containment system is disclosed in U.S. Pat. No. 6,315,003, the entire contents of which are incorporated herein by reference. While well-suited for its intended purpose, the system may be improved.

SUMMARY

An embodiment of the invention is a piping system including a fluid impermeable sleeve having a plurality of longitudinal, spaced ribs formed on an interior surface of the sleeve. A fluid carrying tubing is positioned internal to the sleeve. A coupling has a first end and a second end, the first end having interior threads engaging an outer surface of the sleeve. The coupling has a vent opening in fluid communication with the interior of the sleeve.

DETAILED DESCRIPTION

Figure 2:
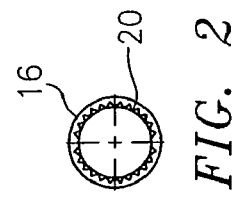
FIG. 2 is a cross-sectional view taken along line 2—2 of FIG. 1.
Figure 1:
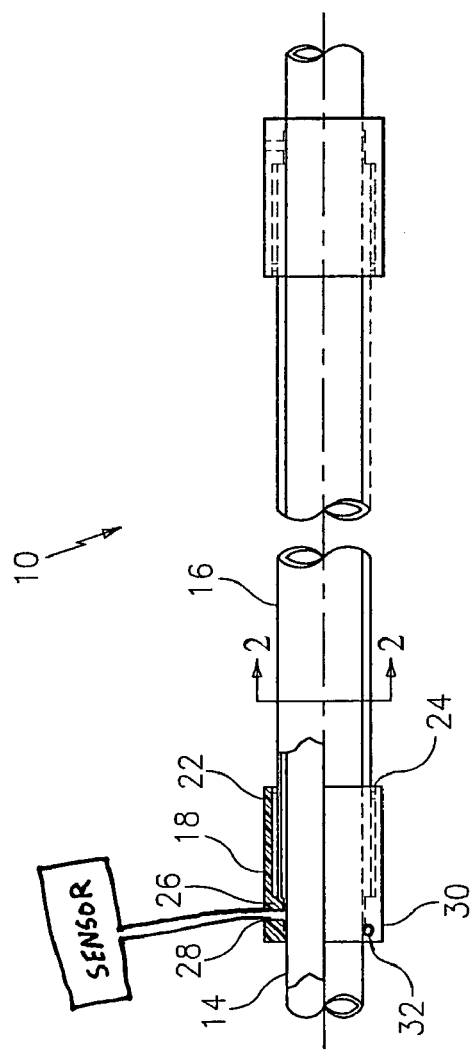
FIG. 1 is a side view, in partial cross-section, of an exemplary tubing containment system.

FIG. 1 is a side view, in partial cross-section, of a tubing containment system 10. The tubing containment system includes tubing 12 (FIG. 3) which may be contained in a jacket 14. The tubing 12, and jacket 14, are contained within a sleeve 16. The sleeve 16 may be made from a fluid impermeable material such as polyethylene or other suitable polymers that allow fluids (e.g., gas, liquid, etc.) to flow to ends of the sleeve 16 for venting. FIG. 2 is a cross section of sleeve 16 showing the inner diameter of sleeve 16 having a number ribs 20 separated by spaces. In one embodiment, the fluid transported by tubing 12 is natural gas. The ribs are longitudinal and run the length of sleeve 16. Ribs 20 in FIG. 2 are triangular in cross-section, but it is understood that other geometries may be used. In the event that tubing 12 leaks, fluids travel along spaces between ribs 20 for venting through couplings 18.

At each end of sleeve 16 is a coupling 18 having a first end 22 that covers the exterior surface of sleeve 16. A seal 24 (e.g., an o-ring) may be located at first end 22 to prevent fluid from exiting coupling 18 at first end 22. Coupling 18 includes a shoulder 26 that serves as a stop to limit the insertion depth of sleeve 16 into coupling 18. Shoulder 26 terminates prior to contacting jacket 14 to provide a passage to vent opening 28.

The interior surface of coupling 18 is preferably threaded. The threads engage the outer surface of sleeve 16 to secure coupling 18 to sleeve 16. Coupling 18 may be made from polyethylene or other polymer. In one embodiment, coupling 18 is made from a harder polymer (i.e., higher durometer) than sleeve 16 to facilitate threading coupling 18 on sleeve 16. Alternatively, coupling 18 may be metal depending on application.

One or more vent openings 28 are provided in coupling 18 located toward a second end 30 of coupling 18. Second end 30 has an inner diameter slightly larger than jacket 14 and a seal 32 (e.g., an o-ring) provides a fluid seal between second end 30 and jacket 14. The vent openings 28 allow fluid leaked from tubing 12 to escape in a controlled manner through vent opening 28. A hose or other conduit may be connected to vent opening 28 to divert leaked fluid. A sensor may also be in fluid communication with vent opening 28 to provide automatic detection of leaks in tubing 12. The jacket 14 of tubing 12 may be perforated or otherwise compromised to facilitate migration of leaked fluid to vent opening 28.

Figure 3:
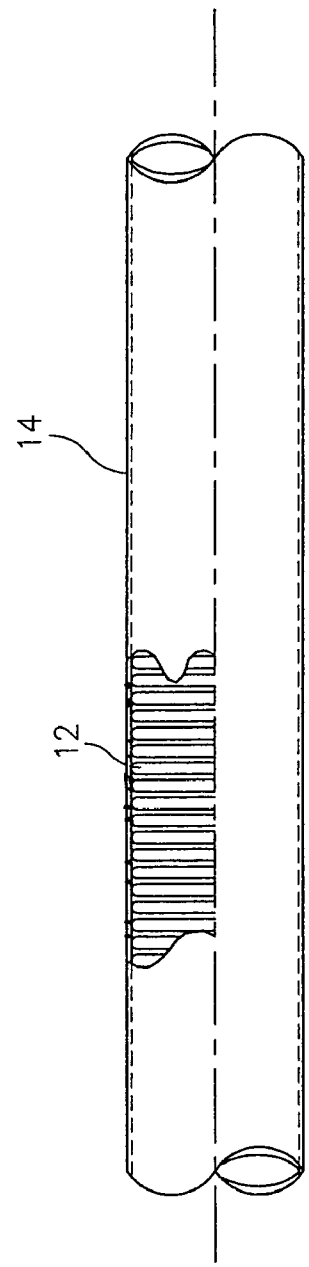
FIG. 3 is a side view of exemplary tubing.

The sleeve 16 may be extruded over tubing 12 (whether or not jacket 14 is present) using a die to form ribs 20 on the interior surface of the sleeve 16. As shown in FIG. 3, the tubing is annular, corrugated tubing, but may be a variety of types of tubing including helically wound tubing. In one embodiment, the tubing 12 is corrugated stainless steel tubing. The jacket 14 may be conductive to dissipate electrical charge.

Figure 4:
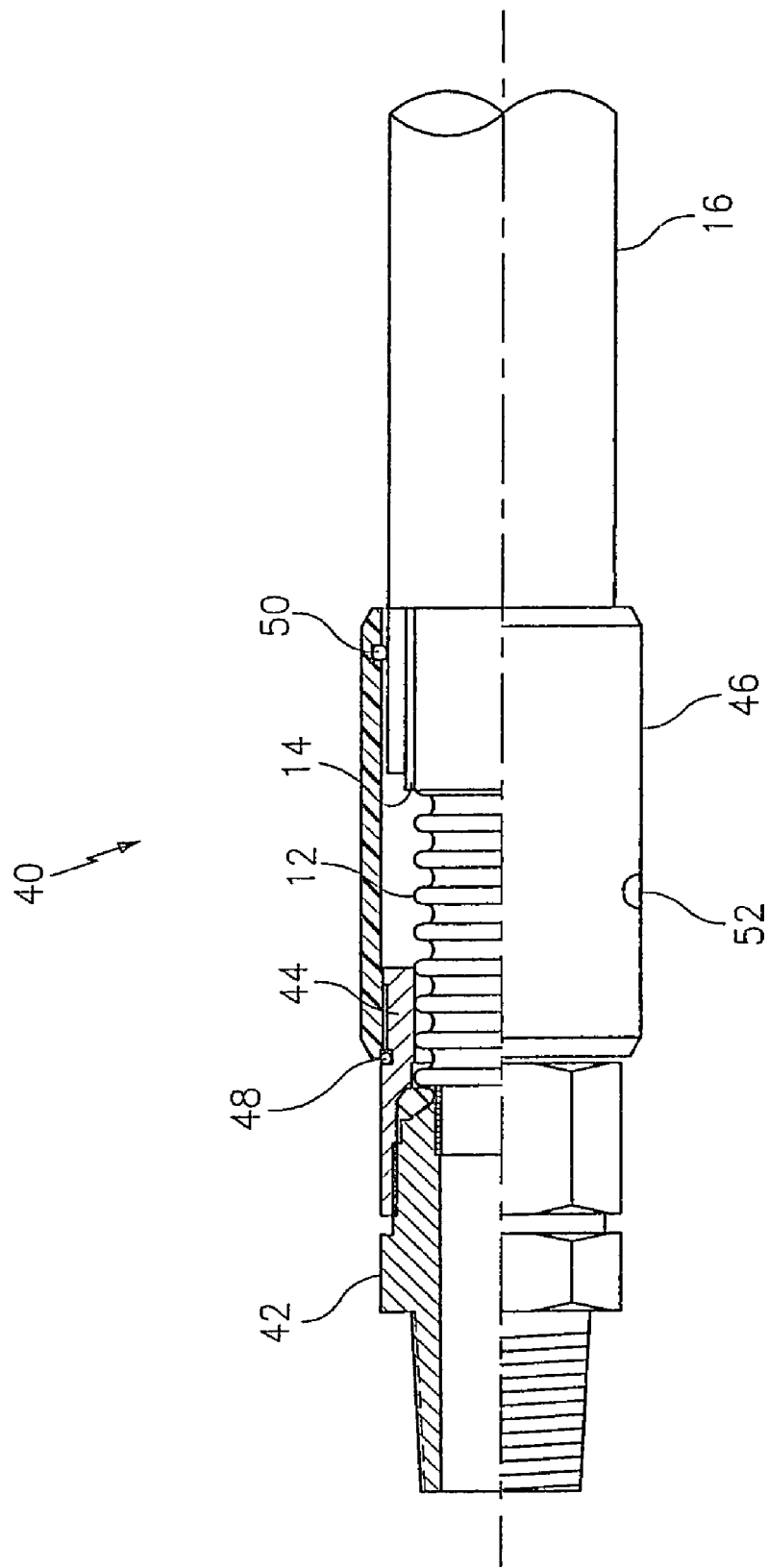
FIG. 4 is a side view, in partial cross-section, of another exemplary tubing containment system.

FIG. 4 is a side view, in partial cross-section, of an alternate tubing containment system 40. Tubing containment system 40 includes tubing 12, jacket 14 (optional) and sleeve 16 similar to those described above with reference to FIGS. 1–3. A fitting 42 is secured to one end of the tubing 12. The fitting 42 may be any known fitting such as those disclosed in U.S. Pat. Nos. 5,799,989, 6,079,749, 6,276,728 the contents of which are incorporated herein by reference, with the inclusion of a threaded extension 44 at the end of the fitting that engages the tubing 12.

The threaded extension 44 is made of metal (e.g., brass) and engages the inner surface of a transition coupling 46. The transition coupling 46 is preferably made from fluid impermeable material such as polyethylene or other suitable polymers that contain fluids (e.g., gas, liquid, etc.). The inner diameter of the transition coupling 46 is slightly larger than the outer diameter of the sleeve 16 causing a friction fit between the transition coupling 46 and the sleeve 16. The threaded extension 44 engages the inner surface of the transition coupling 46 to secure the fitting 42 to the transition coupling 46. A seal 48 (e.g., o-ring) and a seal 50 (e.g., o-ring) provide a fluid-tight connection between the transition coupling 46 and the fitting 42 and the sleeve 16, respectively. A vent opening 52 (optionally threaded) provides for egress of fluid and/or monitoring of leaking fluid by automated detection apparatus.

The tubing containment system 40 operates in a manner similar to tubing system 10. If a leak occurs in tubing 12, the fluid is conveyed along the space between tubing 12 and sleeve 16. The fluid is contained in transition coupling 46 and expelled through vent opening 52.

The transition coupling 46 covers the tubing 12 up to fitting 42 and overlaps fitting 42 to eliminate any exposed tubing 12. The transition coupling 46 and the fitting 42 are preferably reusable.

The tubing containment systems may be used in a number of applications including direct underground burial, above ground outdoor use, indoor use at elevated pressure for safety and other secondary containment and sensing systems for petrochemical lines.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A piping system comprising:
    a fluid impermeable sleeve having a plurality of longitudinal, spaced ribs formed on an interior surface of said sleeve;
    metal, corrugated fluid carrying tubing positioned internal to said sleeve;
    a coupling having a first end and a second end, said first end having interior threads engaging an unthreaded outer surface of said sleeve;
    said coupling having a vent opening in fluid communication with said interior of said sleeve and an exterior surface of said sleeve;
    a metal lifting secured to an external surface of said tubing and coupled to an interior surface of said coupling.
2. The piping system of claim 1 wherein:
    said sleeve is a polymer.
3. The piping system of claim 1 wherein:
    said coupling is a polymer.
4. The piping system of claim 1 wherein:
    said second end having a shoulder to form a stop against said sleeve.
5. The piping system of claim 1 wherein:
    said coupling has a higher durometer than said sleeve.
6. The piping system of claim 1 further comprising: an o-ring on an interior of said coupling proximate said first end.
7. The piping system of claim 1 wherein:
    said tubing is corrugated stainless steel tubing.
8. The piping system of claim 1 wherein:
    said fitting has a threaded extension and engages an interior surface of said coupling at said second end.
9. The piping system of claim 8 wherein:
    said fitting is made of metal.
10. The piping system of claim 8 further comprising:
    an o-ring positioned between said extension and said coupling.
11. The piping system of claim 1 wherein:
    said tubing has a jacket.
12. The piping system of claim 11 wherein:
    said jacket is perforated.
13. The piping system of claim 1 wherein:
    said ribs have a triangular cross section.
14. The piping system of claim 1 further comprising:
    a hose connected to said vent opening.
15. The piping system of claim 1 further comprising:
    a sensor monitoring fluid from said vent opening.

* * * * *